(12) United States Patent
Proctor

(10) Patent No.: US 8,695,337 B2
(45) Date of Patent: Apr. 15, 2014

(54) GAS SEALING ARRANGEMENT FOR A VARIABLE GEOMETRY TURBOCHARGER

(75) Inventor: Timothy James William Proctor, Columbus, IN (US)

(73) Assignee: Cummins Turbo Technologies Limited, Huddersfield (GB)

(*) Notice: Subject to any disclaimer, the term of this patent is extended or adjusted under 35 U.S.C. 154(b) by 366 days.

(21) Appl. No.: 13/072,743

(22) Filed: Mar. 27, 2011

(65) Prior Publication Data

US 2011/0252787 A1 Oct. 20, 2011

Related U.S. Application Data

(60) Provisional application No. 61/319,478, filed on Mar. 31, 2010.

(51) Int. Cl.
*F02D 23/00* (2006.01)
*F04D 27/00* (2006.01)
*F01D 17/14* (2006.01)
*F01D 17/00* (2006.01)

(52) U.S. Cl.
USPC .............................. 60/602; 415/157; 415/158

(58) Field of Classification Search
USPC .................... 415/157, 158; 417/407
See application file for complete search history.

(56) References Cited

U.S. PATENT DOCUMENTS

| 4,685,869 | A  | * | 8/1987  | Sasaki ........................... 417/407 |
| 4,907,952 | A  | * | 3/1990  | Inoue et al. ................... 417/407 |
| 5,549,449 | A  | * | 8/1996  | McInerney et al. ........... 415/177 |
| 8,172,516 | B2 | * | 5/2012  | Parker et al. .................. 415/151 |
| 2004/0081567 | A1 | * | 4/2004  | Boening ....................... 417/406 |
| 2006/0037317 | A1 | * | 2/2006  | Leavesley ....................... 60/602 |
| 2008/0089782 | A1 | * | 4/2008  | Parker et al. .................. 415/150 |
| 2010/0322757 | A1 | * | 12/2010 | Hall et al. ..................... 415/148 |
| 2011/0135449 | A1 | * | 6/2011  | Parker et al. ............... 415/121.2 |
| 2011/0167817 | A1 | * | 7/2011  | Sausse et al. .................... 60/602 |
| 2012/0189433 | A1 | * | 7/2012  | Baker et al. ................... 415/158 |
| 2013/0036733 | A1 | * | 2/2013  | Severin et al. ............... 60/605.1 |
| 2013/0315718 | A1 | * | 11/2013 | Parker et al. .................. 415/157 |

FOREIGN PATENT DOCUMENTS

JP          63143326 A  *  6/1988  ............. F02B 39/00

* cited by examiner

*Primary Examiner* — Thomas Denion
*Assistant Examiner* — Jessica Kebea
(74) *Attorney, Agent, or Firm* — Krieg DeVault LLP; Clifford W. Browning

(57) ABSTRACT

A piston ring for sealing gas flow past a sliding cylinder is provided at the interface of the turbine and bearing housings, and is axially close to the turbine inlet. A V-band or similar connection joins the turbine and bearing housings but it is axially further away from the turbine inlet. The piston ring is provided with a spacer element between it and the bearing housing that is at least partially thermally decoupled from the bearing housing.

13 Claims, 6 Drawing Sheets

GAS SEALING ARRANGEMENT FOR A VARIABLE GEOMETRY TURBOCHARGER

CROSS REFERENCE TO RELATED APPLICATIONS

The present application claims the benefit of U.S. Provisional Patent Application No. 61/319,478, filed Mar. 31, 2010, and is incorporated herein by reference.

TECHNICAL FIELD

The present invention relates generally to a gas seal arrangement disposed about a sliding wall of a variable geometry turbine of a turbocharger.

BACKGROUND

Sliding wall variable geometry turbines are commonly provided with a piston ring, to mitigate passage of exhaust gas between the main gas passage (from the volute through the nozzle to the turbine) and a region behind the nozzle. Gas flow through leakage paths is inherently inefficient and is disadvantageous in standard operating conditions. The relatively high temperature environment requires clearances to be incorporated between moving parts so that they do not rub together and wear or jam. The exhaust gas temperatures generally limit the ability to use relatively low temperature capable materials for the piston ring.

The clearance between vanes and a shroud (where provided) cannot generally be provided with a positive seal; however, sliding wall variable geometry turbine mechanisms typically have a cylindrical element which slides from or retracts into a corresponding cylindrical cavity. The clearance between these two cylindrical elements can be sealed quite effectively with a piston ring, which is typically retained in a groove in one of the elements, and is resiliently biased towards the other element.

In some prior sliding wall variable geometry turbine mechanisms the piston ring is retained in the radially outboard, inwardly facing surface of an annular cavity, and is resiliently biased radially inwardly to rest against the surface of an outer cylindrical wall of a sliding gas control surface (which might include a radial wall with vanes or a shroud). This piston ring may be retained in a groove defined in the interface between the bearing housing and the turbine housing.

An engineer designing a turbocharger often considers many factors including the cost of the turbocharger, the ease of packaging the turbocharger into an engine compartment, as well as the width of the shaft between the turbine and compressor which affects efficiency of fluid film bearings if provided. One consideration is to minimize the axial length of the turbocharger while recognizing that the piston ring is axially near the main gas passage (i.e. axially outboard away from the compressor and bearing housings). Conversely the V-band, which retains the turbine and bearing housings together, is positioned at an axial distance inboard of the turbine housing, due to the width of the V-band.

The technical field of gas sealing arrangements disposed about a sliding wall of a variable geometry turbine of a turbocharger is an area where further technical developments are desired. The present application contributes to this technical field in a novel and nonobvious manner.

SUMMARY

One embodiment of the present invention is a unique gas seal arrangement having an annular spacing element located between a piston ring and a bearing housing. Other embodiments include apparatuses, systems, devices, hardware, methods, and combinations for incorporating an annular spacing element between the piston ring and the bearing housing. Further embodiments, forms, features, aspects, benefits, and advantages of the present application shall become apparent from the description and figures provided herewith.

DESCRIPTION OF THE ILLUSTRATIVE FIGURES

DESCRIPTION OF THE ILLUSTRATIVE EMBODIMENTS

Figure 1:
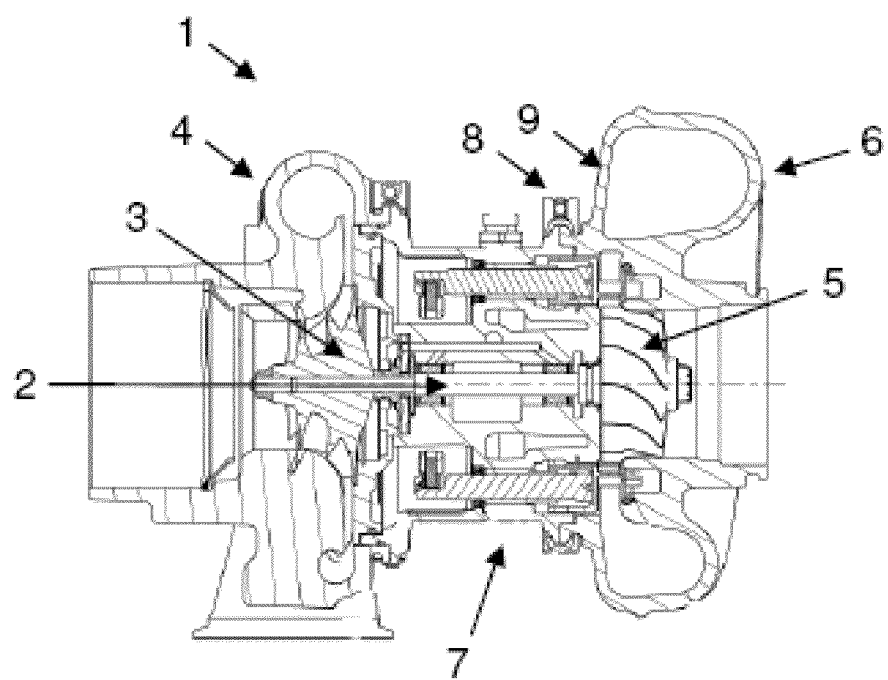
FIG. 1 illustrates in cross section a variable geometry turbocharger according to one form of the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment, a piston ring for sealing gas flow past a sliding cylinder is located at the interface of the turbine and bearing housings, and is axially close to the turbine inlet. A V-band or similar connection joins the turbine housing and bearing housing and is axially further away from the turbine inlet. A spacer element is disposed between the piston ring and the bearing housing and is at least partially thermally decoupled from the bearing housing, and has a relatively better thermal link with the turbine housing. This allows the region between the piston ring and the V-band interface more tendency to thermally expand in tandem with the turbine housing, which reduces variation in the width of the groove that the piston ring sits in. The reduction in gap width variation should have the effect that the friction experienced by the variable geometry mechanism will be more reliably low.

The applicants have discovered that there is potential for more variation in the width of the groove, than would be expected due to conventional thermal expansion of the general area around the piston ring.

The applicants have discovered that a cyclic variation is possible whereby after the engine is turned on the gap might widen to permits soot (which may be present in the exhaust upstream of a filter) to enter the groove. After the engine is turned off any increase in gap width would reverse. The applicants have discovered that should this effect occur, soot could be trapped in the groove behind the piston ring, and/or to the side of the piston ring between the piston ring and a side of the groove.

The applicants have discovered that if the groove did clamp around the extra soot and the piston ring, this could prevent the piston ring from expanding radially shortly after the engine is again turned on. The applicants have identified that the sliding wall of the variable geometry mechanism is one of the first parts of the turbocharger to expand thermally once the engine is turned on, and as a result it would press outwardly against the jammed piston ring, before the piston ring is released by expansion of the groove. The applicants have identified that this could have the result of increasing the friction experienced by the sliding wall while being actuated to move. In an extreme scenario this could lead to the engine management system identifying there to be a problem with the turbocharger actuator and/or variable geometry mechanism.

The present application contemplates the utilization of a variable geometry turbocharger with an internal combustion engine. In one form the internal combustion engine is a diesel engine, however in another form the engine is a spark ignited gasoline engine. The present application contemplates the meaning of the word engine broadly and is not limited to a specific type of fuel unless specifically provided to the contrary. Additionally, the present application contemplates the integration of the engine and the variable geometry turbocharger with other equipment including, but not limited to, vehicles (for example trucks, cars), water going vessels, power generation equipment, and stationary equipment.

Referring now to FIG. 1, a cross section view of a variable geometry turbocharger 1 according to one form of the prior art is shown. A central shaft 2 supports a compressor wheel 3 within a compressor housing 4 and a turbine wheel 5 within a turbine housing 6. A bearing housing 7 is arranged between the turbine housing 6 and compressor housings 4, and is connected to the turbine housing 6 by a V-band 8 which is tightened around flanges at respective mating edges of the bearing housing 7 and the turbine housing 6. The V-band connection 8 is axially separated from the wall of the turbine housing volute 9 which defines the exhaust gas inlet towards the turbine.

Figure 2:
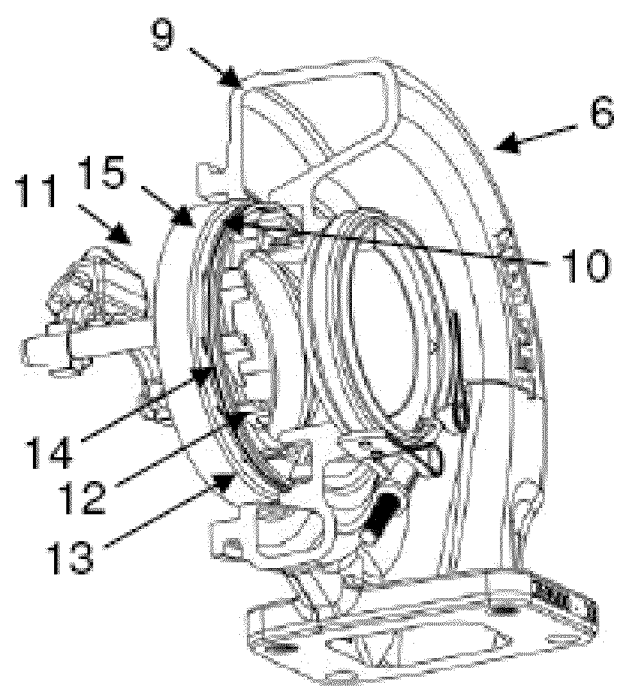
FIG. 2 is cut-away perspective view of a variable geometry turbine mechanism according to one form of the prior art.

FIG. 2 shows a cut away perspective view of the turbine end of a prior art turbocharger. The turbine housing volute 9 channels exhaust gas spirally inward to a nozzle section 10 of an annular inlet. A variable geometry turbine mechanism 11 is operatively controlled to slide axially from the left to reduce the cross sectional area of the turbine inlet.

In this example the mechanism 11 provides vanes 12 on a moving wall 13 which slide into matching vane-shaped openings in a shroud 14. The moving wall 13 and the shroud define the width of the annular channel however other designs are possible. In general a sliding variable geometry mechanism will usually have a cylindrical surface 15 which blocks inward flow of exhaust gas.

Figure 3:
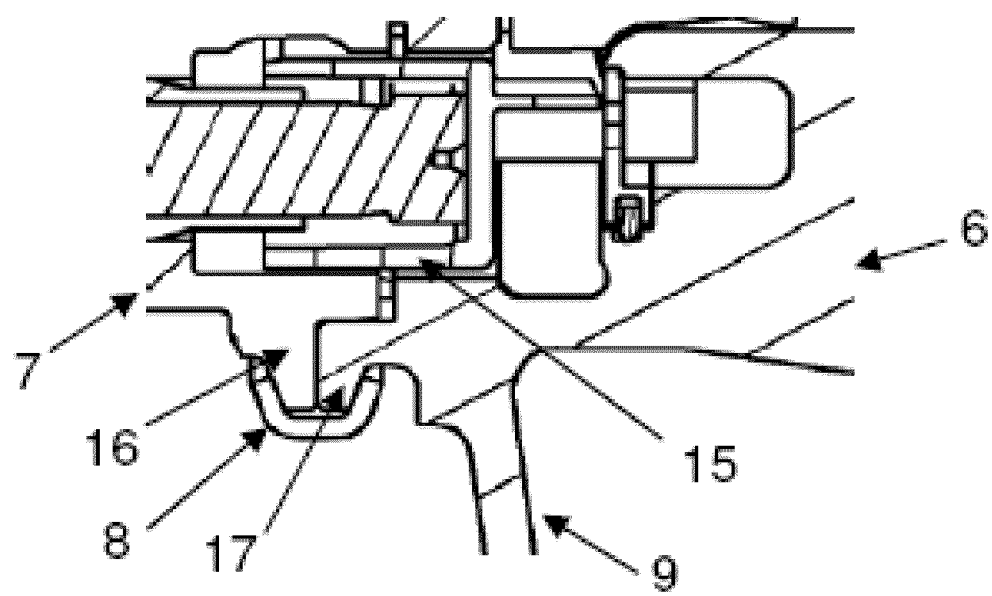
FIG. 3 is a cross-section view of the interface between the bearing housing, turbine housing and variable geometry turbine mechanism according to one form of the prior art.

FIG. 3 illustrates an interface between the bearing housing 7, the turbine housing 6 and the sliding cylindrical surface 15. The flanges 16, 17 provided at the mating surfaces of the bearing housing 7 and turbine housing 6 can be seen. These flanges 16 and 17 are urged together by a circular V-band 8, which in one form is tightened around them using a bolt and screw thread (not shown).

Figure 4:
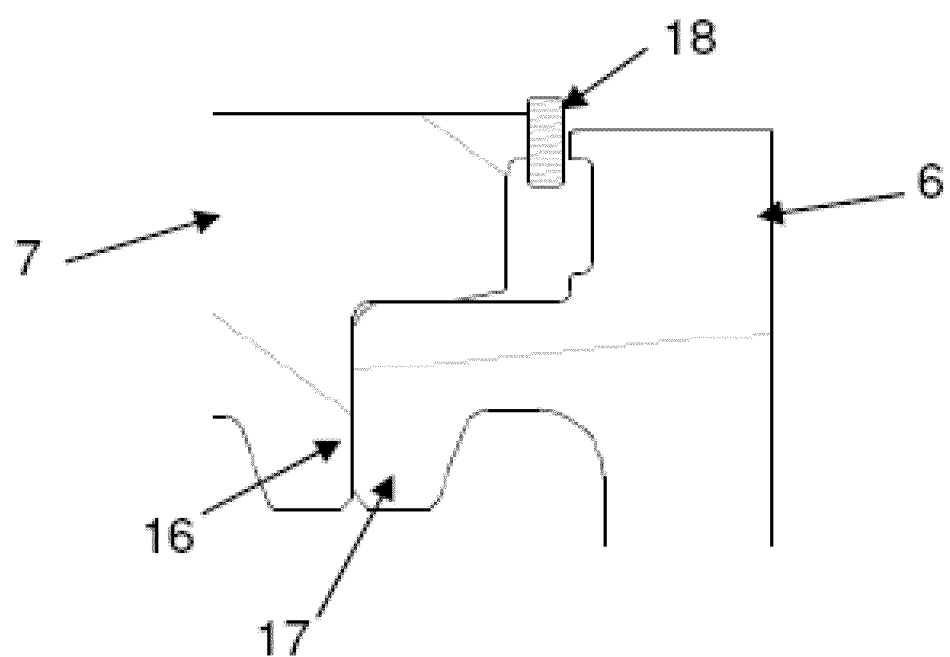
FIG. 4 is a cross-section view of the piston ring between the turbine housing and bearing housing according to one form of the prior art.

FIG. 4 illustrates a view of the interface between the turbine housing 6 and bearing housing 7. In this view the axially sliding cylindrical surface is not shown. The interface is radial at the outer periphery in the region of the two flanges 16, 17, but extends axially between this radial section and a second (inner) radial section which defines a groove that seats a piston ring 18. Each side of the piston ring 18 is supported by a housing surface which in this example each have circular lips. The lips facilitate provision of an enlarged space behind the piston ring. This space is provided so that if a small quantity of soot is deposited behind the piston ring then it should not limit the radial expansion and contraction of the piston ring.

Figure 5:
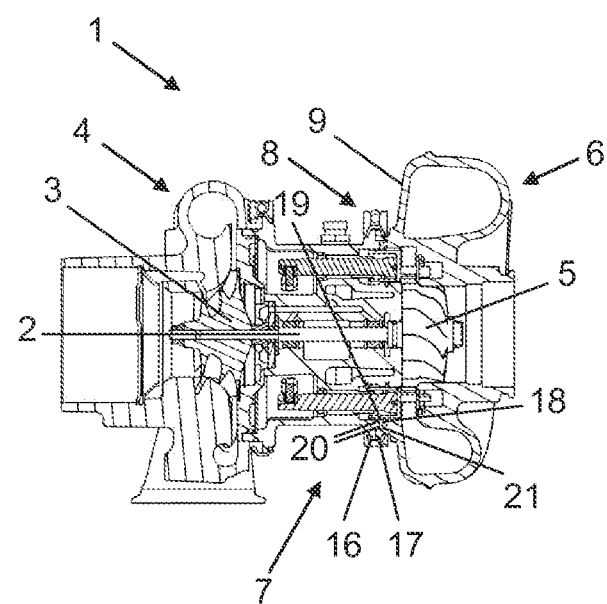
FIG. 5 is a cross-section view of an interface including a piston ring and a spacing element between the turbine housing and the bearing housing according to one embodiment of the present invention.
Figure 6:
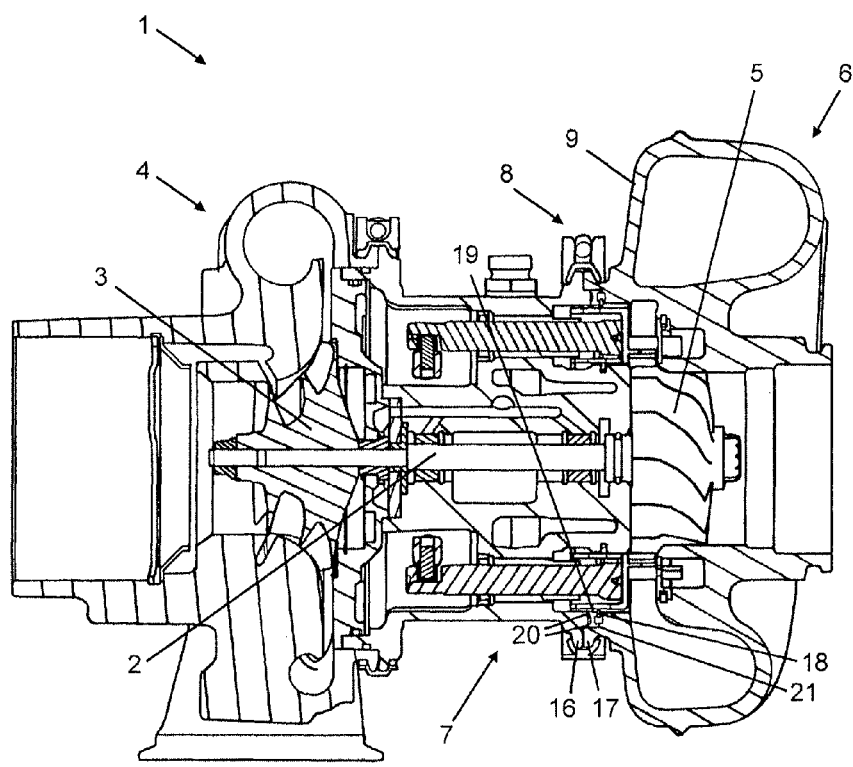
FIG. 6 is a cross-sectional view of a variable geometry turbocharger including a piston ring and a spacing element between the turbine housing and the bearing housing as illustrated in FIG. 5, according to one embodiment of the present invention.

FIG. 5 illustrates one embodiment of the present invention. Here it can be seen that the bearing housing 7 does not extend far beyond the V-band interface between the flanges 16 and 17 towards the piston ring 18. In the present application, the spacer element 19 is disposed between the bearing housing 7 and the piston ring 18. The use of the term between is not intended to be limited to a meaning that the spacer element 19 is intermediate the bearing housing 7 and the piston ring 18 unless specifically provided to the contrary. The present application contemplates that the spacer element 19 can be located at a variety of positions relative to the bearing housing 7 and the piston ring 18. The interface between the spacer element 19 and the bearing housing 7 reduces the tendency of the region, which the spacer element 19 has been substituted into, to expand in tandem with the bearing housing 7, and allows this region to expand approximately in tandem with the turbine housing 8.

In one form spacing element 19 is shaped to have a reduced contact area with the bearing housing 7 (two circular lips 20 are radially separated to leave an insulating air-gap between them). However, the spacer element 19 has thermal contact with the turbine housing 6. In another form the spacer element 19 has good thermal contact with the turbine housing 6. In one form of the present application, the position of the spacer element 19 is controlled by an abutment feature 21 disposed against the turbine housing which minimizes part-to-part variation in the width of the piston ring gap. One form of the present invention results in the variation in the width of the piston ring gap is reduced, and this reduces the chances of the variable geometry mechanism experiencing increased friction.

In one embodiment of the present invention, a variable geometry turbocharger has a turbine housing, a bearing housing and a compressor housing. The turbocharger also includes a shaft supported about an axis in the bearing housing supporting and connecting a turbine within the turbine housing and a compressor within the compressor housing. The turbocharger also includes a turbine inlet volute, and at least one side wall of an annular turbine inlet passage, defined by the turbine housing and a circular interface surface, defined by respective mating surfaces of the turbine housing and the bearing housing, and having a radially peripheral annular portion arranged at a first axial location. The turbocharger further includes a variable geometry turbine mechanism, comprising an axially slidable cylinder, arranged to vary the cross sectional area of the annular turbine inlet passage. A piston ring is disposed against the outer surface of the axially slidable cylinder, and within an annular groove at a radially inboard end of the circular interface surface. The piston ring is arranged at a second axial location, being different from the first axial location. The turbocharger further includes an annular spacing element is provided axially adjacent to the piston ring on the side that is away from the turbine inlet, the annular spacing element and the turbine housing defining the annular groove.

In one form the annular spacing element is to some extent thermally isolated from the bearing housing by virtue of having a surface contact interface rather than a contiguous material interface. The temperature variation of the spacing element can then vary in temperature somewhat less in tandem with the bearing housing, and at least slightly more in tandem with the turbine housing and/or the piston ring or exhaust gas temperature. This reduces the amount that the groove expands after the engine is started.

Preferably the contact area between the bearing housing and the annular spacing element is less than the cross-sectional area of the body of the annular spacing element in the radial plane. This can further thermally isolate the spacing element from the bearing housing, allowing it to be further linked to the temperature of the turbine housing, thus further reducing the variation in the width of the annular groove.

Preferably the contact area between the bearing housing and the annular spacing element includes a cylindrical lip having less radial width than that of the body of the spacing element. This provides the reduction in contact area discussed above, whilst mitigating stresses in the spacing element, and/or ingress of soot that might otherwise be possible for example if a ring of protrusions or radial ribs was provided instead of the circular lip.

Preferably the contact area includes a radially inner lip and a radially outer lip. In one form this mitigates stresses in the annular spacing element.

Preferably the lip or lips are defined by the annular spacing element.

Preferably the annular spacing element is sized to contact the turbine housing along the radial periphery of the annular spacing element. This provides an improved thermal link between the turbine housing and the annular spacing element thus promoting the two components to thermally expand and contract in tandem, which in turn reduces the variation in the width of the annular groove.

Preferably the contact area between the spacing element to the turbine housing exceeds the contact area between the spacing element to the bearing housing. This further strengthens the thermal link between the spacing element and turbine housing. Indeed the ratio of contact with the turbine housing, to contact with the bearing housing preferably exceeds 1.5 more preferably 2 and most preferably 3.

The annular spacing element may be of a different material to the turbine housing. This can be provided to vary the rate or timing of the expansion and contraction of the groove.

The annular spacing element may have a higher thermal conductivity than the turbine housing (perhaps greatly so). This can reduce the delay between the turbine housing changing temperature and the annular spacing element changing temperature.

The annular spacing element may have a higher coefficient of thermal expansion than the turbine housing. This can compensate at least to a small degree for the effect of the residual thermal link between the spacing element and the bearing housing.

Traditionally the turbine housing has been constructed of cast iron. Examples of suitable materials with greatly higher thermal conductivity than cast iron include brass and bronze, however a wide range of alloys and steels could be used. Examples of suitable materials with a higher coefficient of thermal expansion than cast iron include certain steels and nickel, however again, a wide range of alloys and steels could be used Preferably the spacing element is axially positioned with respect to the turbine housing by axial abutment between the spacing element and the turbine element. This can help reduce part-to-part variation in the width of the groove.

In general, the annular spacing element, in combination with its surface connection to the bearing housing having thermal expansion properties by virtue of its composition and/or shape that differ from those that an annular and contiguous extension of the bearing housing towards the piston ring would provide. The present application contemplates that the rate and/or timing of the expansion and contraction of the groove can be modified further.

According to a second aspect of the invention there is provided an engine system comprising the variable geometry turbocharger of the first aspect.

According to a third aspect of the invention there is provided a kit for the variable geometry turbocharger of the first aspect, the kit comprising at least the annular spacing element.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A variable geometry turbocharger, comprising
a turbine housing, a bearing housing and a compressor housing;
a shaft supported in the bearing housing and coupling a turbine within the turbine housing and a compressor within the compressor housing;
a turbine inlet volute, and at least one side wall of an annular turbine inlet passage, defined by the turbine housing;
a circular interface surface, defined by respective mating surfaces of the turbine housing and the bearing housing, and having a radially peripheral annular portion arranged at a first axial location;
a variable geometry turbine mechanism including an axially slidable cylinder arranged to vary the cross sectional area of the annular turbine inlet passage;
a piston ring disposed against an outer surface of the axially slidable cylinder and located within an annular groove at a radially inboard end of the circular interface surface, the piston ring arranged at a second axial location different from the first axial location; and
an annular spacing element located between the piston ring and the bearing housing and disposed axially adjacent to the piston ring, the annular spacing element and the turbine housing defining the annular groove.

2. The variable geometry turbocharger of claim 1, wherein the contact area between the bearing housing and the annular spacing element is less than the cross-sectional area of the body of the annular spacing element in the radial plane.

3. The variable geometry turbocharger of claim 2, wherein the contact area between the bearing housing and the annular spacing element includes a cylindrical lip having less radial width than that of the body of the spacing element.

4. The variable geometry turbocharger of claim 1, wherein the contact area includes a radially inner lip and a radially outer lip.

5. The variable geometry turbocharger of claim 4, wherein the lips are defined by the annular spacing element.

6. The variable geometry turbocharger of claim 1, wherein the annular spacing element is sized to contact the turbine housing along the radial periphery of the annular spacing element.

7. The variable geometry turbocharger of claim 6, wherein the contact area between the spacing element and the turbine housing exceeds the contact area between the spacing element and the bearing housing.

8. The variable geometry turbocharger of claim 1, wherein the annular spacing element includes means for reducing thermal transfer between the bearing housing and the annular spacing element.

9. The variable geometry turbocharger of claim 8, wherein the annular spacing element has a higher thermal conductivity than the turbine housing.

10. The variable geometry turbocharger of claim 8, wherein the annular spacing element has a higher coefficient of thermal expansion than the turbine housing.

11. The variable geometry turbocharger of claim 1 wherein the annular spacing element is axially positioned with respect to the turbine housing by an axial abutment between the spacing element and the turbine housing.

12. The variable geometry turbocharger of claim 1, wherein the turbine is operably coupled to an exhaust flowpath of an engine; and further comprises a compressor mechanically driven by the turbine and structured to provide compressed air to an intake of the engine.

13. A kit, comprising:
a turbine housing having a turbine inlet volute, the turbine housing defining at least one side wall of an annular turbine inlet passage, and a circular interface surface, defined by respective mating surfaces of the turbine housing and a bearing housing, the circular interface surface having a radially peripheral annular portion arranged at a first axial location;
a shaft structured to be supported in the bearing housing and structured to interconnect a turbine within the turbine housing and a compressor within a compressor housing;
a variable geometry turbine mechanism, structured to include an axially slidable cylinder, structured to be disposed in a manner capable of allowing the mechanism to vary the cross sectional area of the annular turbine inlet passage;
a piston ring structured to be disposed against an outer surface of the axially slidable cylinder and disposed within an annular groove at a radially inboard end of the circular interface surface, the piston ring is structured to be arranged at a second axial location different from the first axial location; and
an annular spacing element, having a higher thermal conductivity than the turbine housing, structured to be disposed between the piston ring and the bearing housing.

* * * * *